(12) United States Patent
Nam et al.

(10) Patent No.: US 8,780,013 B2
(45) Date of Patent: Jul. 15, 2014

(54) DISPLAY DEVICE AND METHOD

(75) Inventors: Dong Kyung Nam, Yongin-si (KR); Gee Young Sung, Daegu-si (KR); Yun-Tae Kim, Hwaseong-si (KR); Ju Yong Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 273 days.

(21) Appl. No.: 12/801,460

(22) Filed: Jun. 9, 2010

(65) Prior Publication Data

US 2010/0315324 A1 Dec. 16, 2010

(30) Foreign Application Priority Data

Jun. 16, 2009 (KR) ........................ 10-2009-0053414

(51) Int. Cl.
*G09G 5/00* (2006.01)
*G09G 3/36* (2006.01)

(52) U.S. Cl.
USPC .................................. 345/6; 345/87; 345/102

(58) Field of Classification Search
USPC .......................... 345/6, 87, 102; 359/462–477
See application file for complete search history.

(56) References Cited

U.S. PATENT DOCUMENTS

| | | | |
|---|---|---|---|
| 2002/0015007 A1* | 2/2002 | Perlin et al. | 345/6 |
| 2002/0171617 A1* | 11/2002 | Fuller | 345/102 |
| 2007/0091638 A1* | 4/2007 | Ijzerman et al. | 362/611 |
| 2008/0316596 A1* | 12/2008 | Cha et al. | 359/463 |
| 2010/0073465 A1* | 3/2010 | Park et al. | 348/51 |

FOREIGN PATENT DOCUMENTS

| | | |
|---|---|---|
| JP | 10-115878 | 5/1998 |
| JP | 10-312162 | 11/1998 |
| JP | 2005-077437 | 3/2005 |
| JP | 2007-514273 | 5/2007 |
| KR | 1020030022582 | 3/2003 |
| KR | 1020060134915 | 12/2006 |
| KR | 1020080024901 | 3/2008 |
| WO | WO 2005/045488 | 5/2005 |

OTHER PUBLICATIONS

Eichenlaub J., "A Lightweight, Compact 2D/3D Autostereoscopic LCD Backlight for Games, Monitor, and Notebook Applications" Proceedings of the International Society for Optical Engineering (SPIE), SPIE, USA LNKD-DOI:10.1117/12.307162, vol. 3295, Jan. 26, 1998, pp. 180-185,XP008022116.
Extended European Search Report corresponds to European Patent Application No. 10165362.4.
Japanese Office Action dated Nov. 26, 2013 from Japanese Patent Application No. 2010-135401, 9 pages.

* cited by examiner

*Primary Examiner* — Alexander Eisen
*Assistant Examiner* — Mark Regn
(74) *Attorney, Agent, or Firm* — Staas & Halsey LLP

(57) ABSTRACT

Disclosed is an image display device and an image display method thereof that may generate a plurality of directional lights based on a number of views of an input image by using a variable scattering feature of a variable scattering layer included in a backlight unit, and may output a multi-view image by using the generated plurality of directional lights.

25 Claims, 12 Drawing Sheets

FIG. 7
410
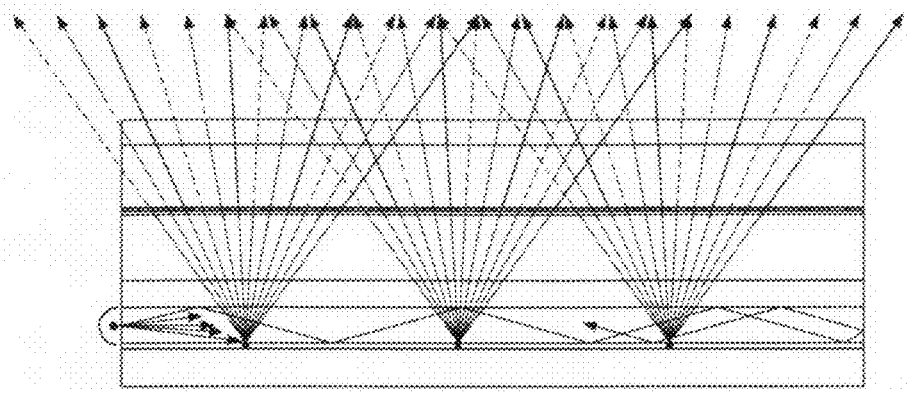
420
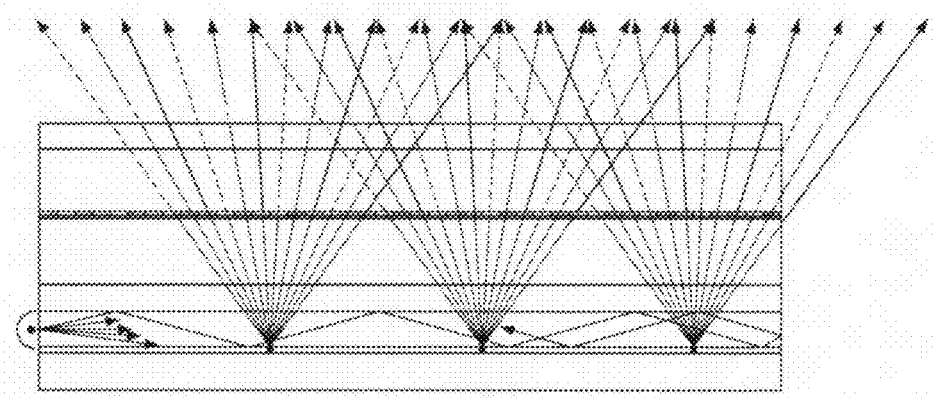
430
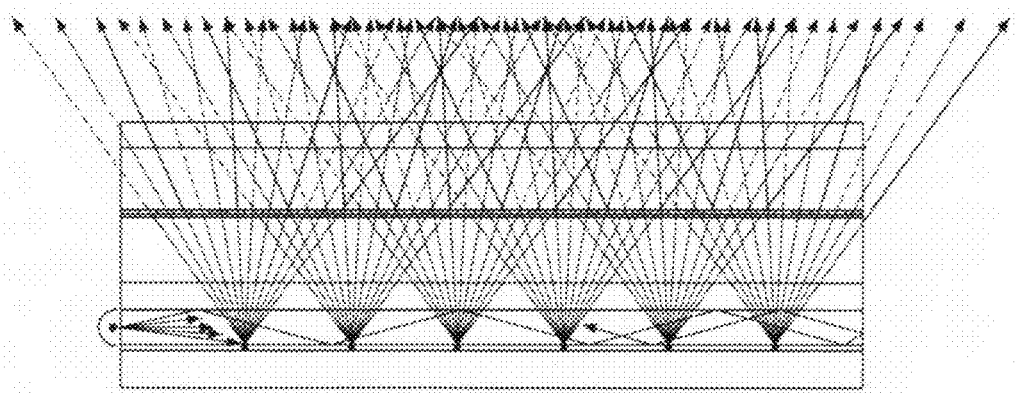

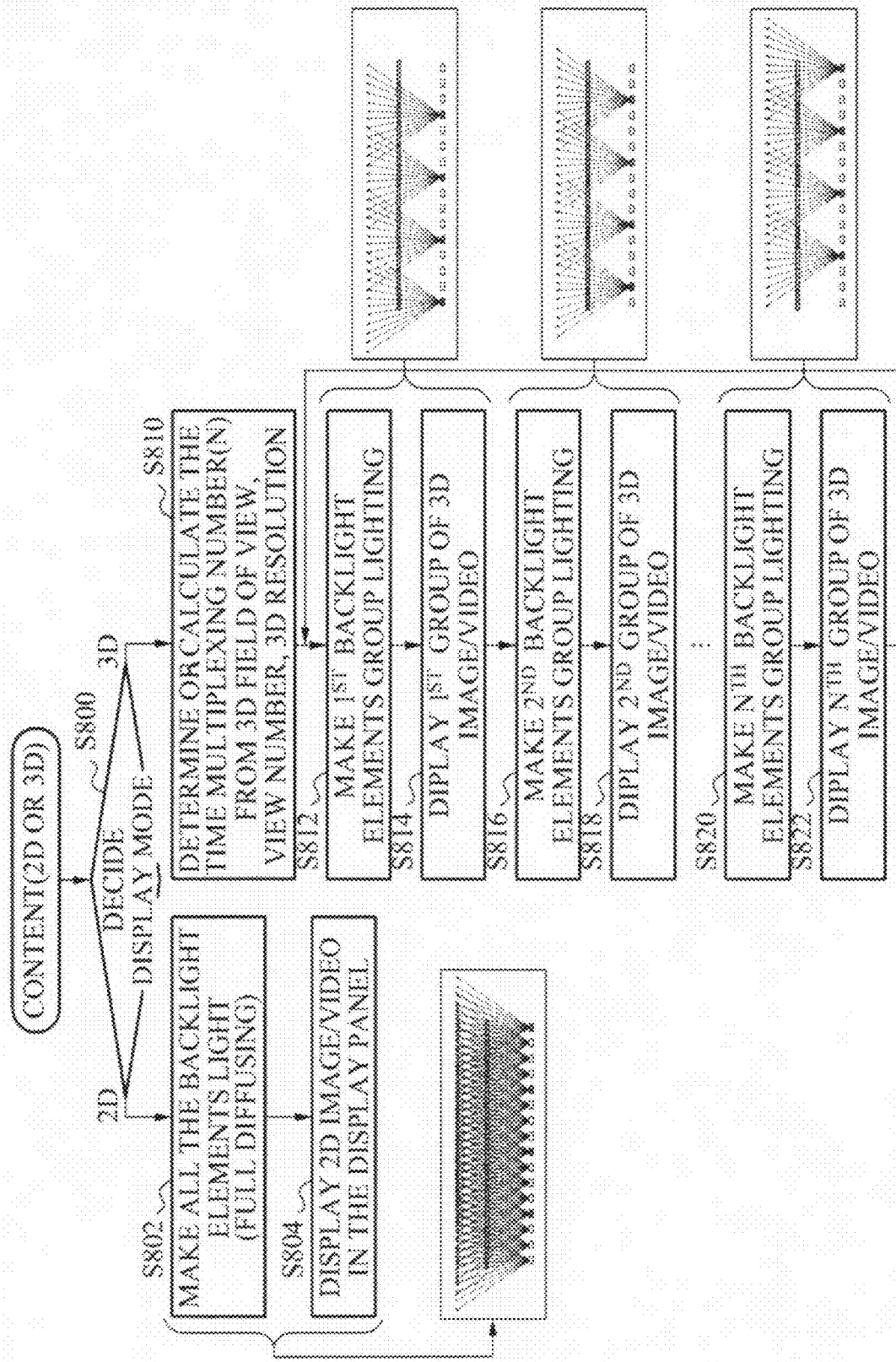

DISPLAY DEVICE AND METHOD

CROSS-REFERENCE TO RELATED APPLICATIONS

This application claims the benefit of Korean Patent Application No. 10-2009-0053414, filed on Jun. 16, 2009, in the Korean Intellectual Property Office, the disclosure of which is incorporated herein by reference.

BACKGROUND

1. Field

One or more embodiments relate to a scheme of displaying a multi-view image or a multi-view image display device.

2. Description of the Related Art

A multi-view image, a stereoscopic image, and the like may be generated by geometrically correcting and spatially processing images recorded by at least two cameras.

The multi-view image and the like relate to a three-dimensional image processing technique that provides an image with various views to a viewer, and particularly to a technique that obtains a same 3D scene by at least two cameras and provides a picture with a more advanced 3D effect, for example.

Recently, various research has been conducted in the areas of super multi-view (SMV), free viewpoint TV (FTV), and the like, as well as the multi-view images.

A multi-view image and the like may be generated through rendering by using a predetermined input image, such as a monocular image and the like, and a depth map with respect to the input image, for example.

SUMMARY

According to one or more embodiments, there may be provided an image display device including a pixel representation unit to control respective representation of at least one pixel unit of an input image, and a backlight unit to selectively generate a plurality of directional lights based on a number of views of the input image, and to apply the generated plurality of directional lights to the pixel representation unit.

According to one or more embodiments, there may be provided an image displaying method including selectively generating a plurality of directional lights based on a number of views of an input image, and respectively forming, by a pixel representation unit, at least one pixel unit of the input image from incidence of the generated plurality of directional lights.

According to one or more embodiments, there may be provided an image display device including a pixel representation unit to represent at least one pixel unit of an input image through individual pixel unit control of pixel units of the pixel representation unit, a backlight unit to selectively generate directional lights based on a number of views of the input image, and to control a projection of different respective directional lights, of the plurality of directional lights, to a pixel unit of the pixel representation unit at different times in an outputting of the input image by the pixel representation unit.

According to one or more embodiments, there may be provided an image display method including selectively generating directional lights based on a number of views of an input image, and controlling a projection of different respective directional lights, of the plurality of directional lights, to a pixel unit of a pixel representation unit at different times, and controlling the pixel representation unit to output the input image based on incidence of the different directional lights, the controlling of the pixel representation unit differently controlling individual pixel units of the pixel representation unit.

Additional aspects and/or advantages will be set forth in part in the description which follows and, in part, will be apparent from the description, or may be learned by practice of the embodiments.

BRIEF DESCRIPTION OF THE DRAWINGS

These and/or other aspects and advantages will become apparent and more readily appreciated from the following description of embodiments, taken in conjunction with the accompanying drawings of which:

FIG. 7 illustrates a view-division feature of an image display device, such as the image display device of FIG. 1, according to one or more embodiments;

FIG. 12 illustrates an image display method, according to one or more embodiments.

DETAILED DESCRIPTION

Figure 1:
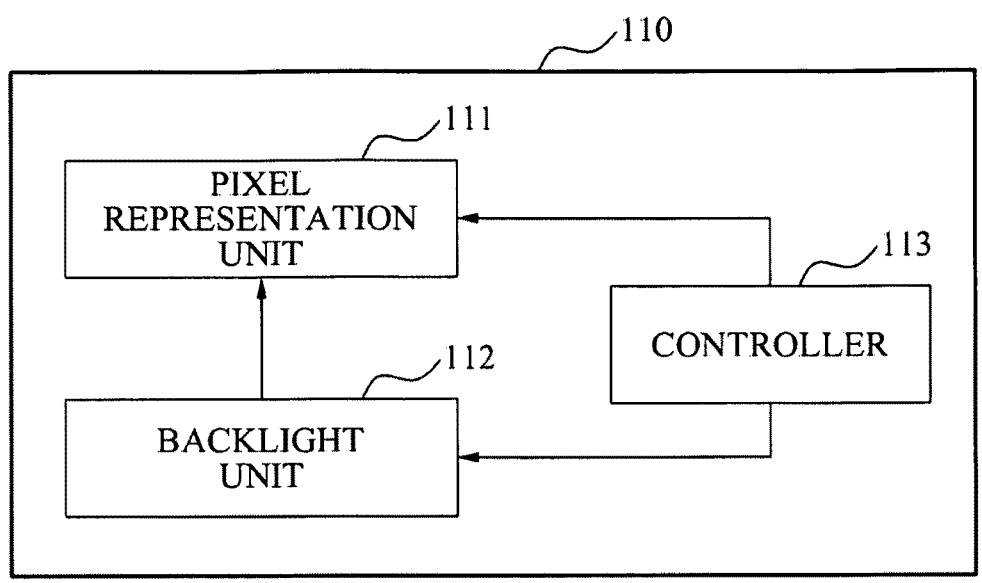
FIG. 1 illustrates an image display device, according to one or more embodiments.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

Currently, to effectively embody an 3D image providing such a stereoscopic sensation, images from different viewpoints have been respectively expressed toward the left eye and right eye of a user. To implement such a stereoscopic sensation without using a filter such as filtering glasses, a 3D image may be displayed by spatially dividing the 3D image at the display based on an expected viewpoint. An existing autostereoscopic 3D display may spatially divide an image at the display by using an optical device(s). Typically, an optical lens or an optical barrier may be used. The lens enables each pixel image to be directed in/toward a specific direction upon exiting the display by using a lenticular lens. The barrier arranges a slit in front of the display, and thus, a specific pixel may only be seen from a specific direction or viewpoint. The autostereoscopic 3D display using the lens and the barrier may basically display images from two viewpoints, namely, a left viewpoint and a right viewpoint. In this instance, an extremely narrow sweet spot may be formed at a certain point in front of the display, where the user would experience the 3D sensation. The sweet spot may be expressed based on a view distance and a view angle. The view distance may be determined based on a pitch of a slit or a lens, and the view angle may be determined based on a number of viewpoints. Techniques that increase the number of viewpoints to enlarge the view angle for a wider sweet spot are, thus, referred to as autostereoscopic multi-view display techniques.

Accordingly, the present inventors have found that though such a multi-view display may provide a wider sweet spot, the approach may cause a deterioration in the definition or resolution of the display. As an example, when a 9-viewpoint image is displayed by a panel having 1920×1080 resolution, e.g., capable of displaying a full HD image, the resolution of a height and the resolution of a width are respectively decreased by ⅓, and thus, an expressible resolution may actually only be 640×360. When the expressible resolution is deteriorated, a conventional 2D image may not be viewed in high definition and thus, it may be difficult for the display to be utilized as a home 3DTV. The present inventors found that a lens-based multi-view display may not display an image in high definition since the lens is permanently attached to the display. In this regard, although corresponding study based on a variable lens has been conducted in an attempt to solve the problem, such an approach may not be commonly used due to performance limitations and the corresponding high costs of implementing such a variable lens. Additionally, though a barrier-based multi-view display may display the 2D image in a high definition upon selective removal of the barrier, the present inventors have found that this barrier approach may also not be an acceptable solution, since there is a dramatic luminance deterioration in the multi-view display when the barrier approach is implemented. Accordingly, the present inventors have found that although the autostereoscopic multi-view display may avoid an inconvenience of wearing filtering glasses and problems of an existing narrow view area, the autostereoscopic multi-view display may have serious deterioration in the image display resolution.

Accordingly, one or more embodiments solve one or more problems of the low 3D resolution with an autostereoscopic multi-view display, by selectively scattering light, such as by a time-division 3D image display.

As noted, when a multi-view image display device is used for displaying a three-dimensional (3D) image and the like, a wider stereoscopic viewing area may be obtained. However, a resolution may be lower depending on a number of views, i.e., the resolution may be directly proportional to the number of views.

As an example, when a 9-view image is represented with a panel of 1920×1080 resolution being capable of representing a full HD image, a width and a height of the resolution respectively decreases by one third, and thereby, the resolution of the image may become 640×360.

With respect to the above description, an image display device according to an aspect of one or more embodiments may generate a directional light from a backlight unit and may directly apply the generated directional light to a pixel representation unit, thereby preventing probable luminance lowering, and may also change a location where the directional light comes from the backlight unit through a view-division, thereby improving a visual resolution of an output image. A time-division directional backlight control may equally be implemented.

FIG. 1 illustrates a configuration of an image display device 110, according to one or more embodiments The image display device 110 according to one or more embodiments may include a pixel representation unit 111, a backlight unit 112, and a controller 113, for example.

The pixel representation unit 111 may visually represent at least one pixel of an image input to the image display device 110. The pixel representation unit may represent pixels on a pixel unit, such as through one or more individual sub-pixels or a full pixel, for example.

In this instance, the input image may be either a three-dimensional (3D) image or a two-dimensional (2D) image, for example.

The backlight unit 112 may generate a plurality of directional rays of light based on the desired number of views of the input image, and may direct the plurality of directional rays of light to the pixel representation unit 111.

The controller 113 may control the pixel representation unit 111 and the backlight unit 112.

The backlight unit 112 may include a light source unit, a light guiding unit, a variable scattering layer, an upper electrode, and a lower electrode, for example, for generating the plurality of directional lights.

Figure 2:
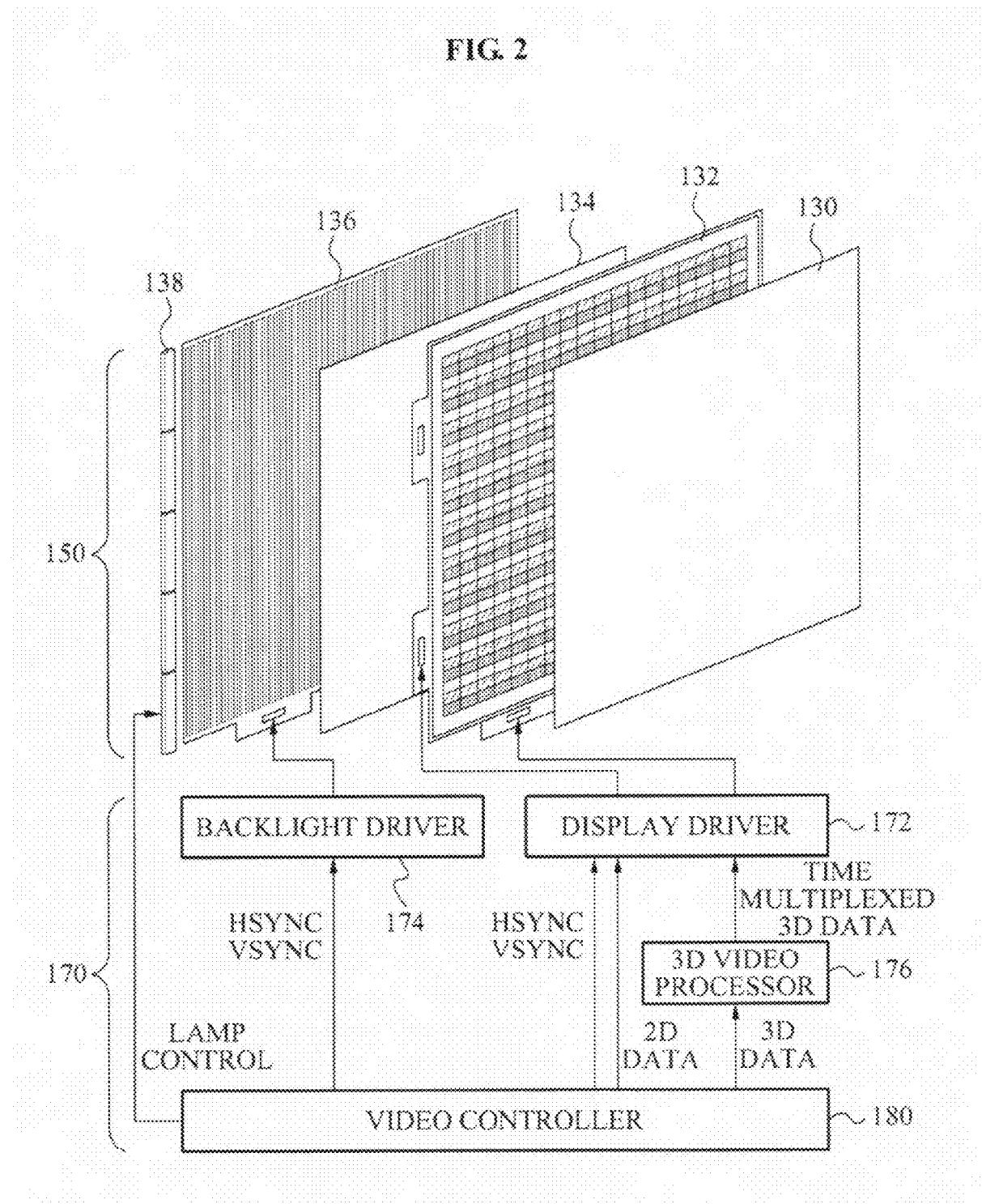
FIG. 2 illustrates an image display device, according to one or more embodiments.

Further to the illustration of the configuration of an image display device of FIG. 1, FIG. 2 further illustrates the configuration in greater detail, classifying the pixel representation unit 111 and backlight unit 112 as display panel unit 150 and the controller 113 as display control unit 170, with the display panel unit 150 potentially including an upper panel polarization film 130, a TFT-LCD module 132, a lower polarization film 134, a backlight module 136, and a light source 138, for example. Here, the backlight module 136 may be controlled to implement a scattering feature, and potentially to generate a time-division directional backlight, for example. The display control unit 170 may include a display driver 172 and a backlight driver 174, for example, and may be controlled by a video controller 180. The arrangement may further include a 3D video processor 176, and 3D data may be transmitted from the video controller 180 to the 3D video processor 176, for provision to the display driver 172, with 2D data being transmitted directly from the video controller 180 to the display driver 172, for example. As illustrated, in an embodiment, the video controller 180 may further provide Hsync and Vsync timing control signals to the respective display driver 172 and the backlight driver 174.

The video controller 180 may thus determine whether an image is to be displayed as a 2D image or a 3D image. When the displayed image is the 2D image, the video controller 180 may display the image without selective light scattering, and potentially the time-division directional light, for example, and when the image is the 3D image, the video controller 180 may generate an image to be displayed in a panel by using a 3D video process based on a 3D definition of the image, a view angle, a number of expression viewpoints, and the like, through control of the backlight's directional light generation, i.e., selective light scattering. Accordingly, in an embodiment, the video controller 180 may determine whether the image to be displayed is the 2D image or the 3D image, and may determine a pattern of a backlight to be displayed/output by controlling the backlight driver 174. A 2D image or 3D image display, and a principal of selective scattering, including time-division 3D image display, and corresponding display methods will be described in further detail below.

Accordingly, in view of the configuration shown in FIG. 2, a configuration and an operation of the backlight unit 112 of FIG. 1 will now be described in further detail with reference to FIG. 3, for example.

Figure 3:
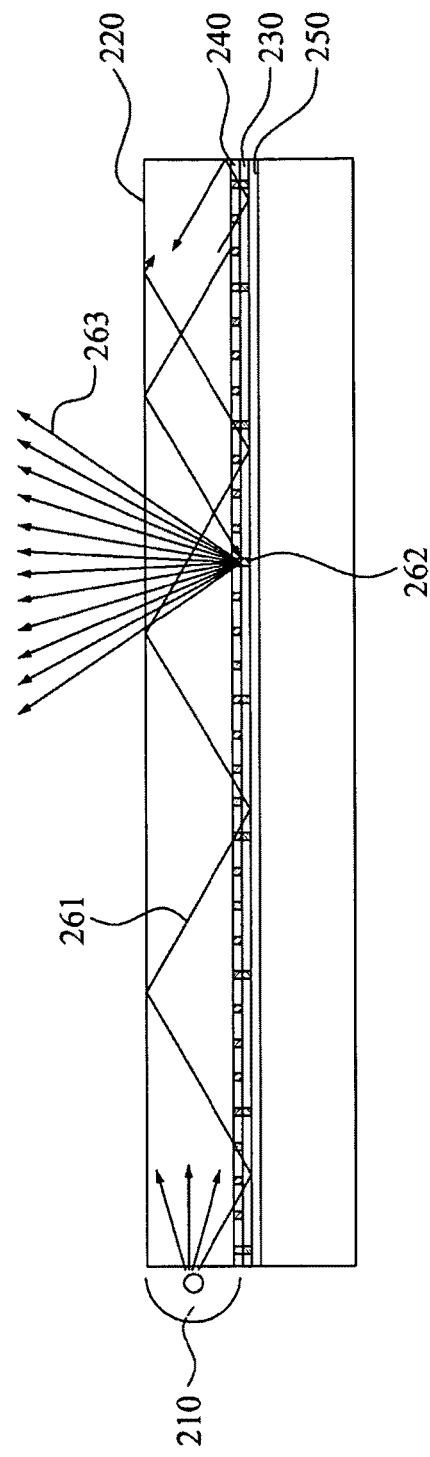
FIG. 3 illustrates a backlight unit, such as the backlight unit of FIG. 1, according to one or more embodiments.

FIG. 3 illustrates an operation of a backlight unit, such as backlight unit 112 of FIG. 1, according to one or more embodiments.

Referring to FIG. 3, the backlight unit may include a light source unit 210, a light guiding unit 220, a variable scattering layer 230, an upper electrode 240, and a lower electrode 250, for example. Here, the light source 210 may correspond to the light source 138 of FIG. 2, and the light guiding unit 220, variable scattering layer 230, upper electrode 240, and lower electrode 250 may correspond to the backlight module 136 of FIG. 2.

The light source unit 210 may emit light.

The light guiding unit 220 may be made up glass, polymer, and the like, for example, and thereby may have a high transparency, and a material making up the light guiding unit 220 may have a different optical refractive index from an exterior of the light guiding unit 220. Also, light emitted from the light source 210 may travel straight or may be reflected internally, and thereby the emitted light is spread.

The variable scattering layer 230 may be placed parallel with the light guiding unit, plural upper electrodes 240 may be placed on a top of the variable scattering layer, and the lower electrode 250 may be placed under the variable scattering layer, for example. Conversely, there may be plural lower electrodes 250 and a single upper electrode 240, or plural upper electrodes 240 and plural lower electrodes 250.

First, when the light source unit 210 emits a light, the emitted light may be total-reflected inside the light guiding unit 220.

The variable scattering layer 230 may selectively, i.e., variably, scatter light 261 that is total-reflected inside the light guiding unit 220.

For this, the variable scattering layer 230 may include a polymer dispersed liquid crystal (PDLC), as only an example.

The PDLC is in a form where an extremely tiny liquid crystal drop is regularly dispersed inside a polymer. Also, the liquid crystal drop may include a plurality of liquid crystals.

In this instance, the liquid crystal drop shows a different optical refractive feature for each orientation, due to an optical aeolotropic feature of the liquid crystal.

Accordingly, when a voltage is appropriately applied to the liquid crystal drop to change an orientation of the liquid crystal drop, the optical refractive index of the liquid crystal drop is changed, and thus, it is possible to enable the PDLC to be either transparent or translucent.

As an example, when a voltage is applied to the variable scattering layer 230, the PDLC may be transparent, and when a voltage is removed from the variable scatter layer 230, the PDLC may be translucent.

Alternatively, when a voltage is applied to the variable scattering layer 230, the PDLC may be translucent, and when a voltage is removed from the variable scatter layer 230, the PDLC may be transparent.

For ease of description, it is assumed that the PDLC is translucent when a voltage is applied to the variable scattering layer 230 in one or more embodiments.

When a voltage is applied to a predetermined location 262 of the variable scattering layer 230, the PDLC that exists in the location 262 where the voltage is applied may be translucent.

Accordingly, the light 261 that is total-reflected inside the light guiding unit 220 may be scattered from the select location 262 where the voltage is applied, and a plurality of directional lights 263 may be generated from the location 262 where the voltage is applied due to the scattering of the light 261. Here, for example, if alternate locations of the PDLC are not applied a voltage, light may not be scattered at those corresponding locations.

In this instance, an electrode having a high transparency, such as a Indium Tin Oxide (ITO), may be used as the upper electrode 240, to spread the light scattered by the PDLC to an upper side.

Also, each electrode having a high reflective feature, such as aluminum, may be used as the lower electrode 250, to spread the light scattered by the PDLC to the upper side.

Also, the upper electrode 240 may be closely and finely arranged to enable a scattered light 263 generated from the PDLC to have a sufficiently narrow form.

Accordingly, the backlight unit scatters the light 261 that is total-reflected inside the light guiding unit 220 by using the variable scattering layer 230, and thus, a directional light for generating a multi-view image may be generated.

A light emitted from the light source unit 210 continuously travels inside the light guiding unit 220 until the PDLC represents a scattering area, and thus, a backlight that is generated when the scattering area is small may be brighter than a backlight that is generated when the scattering area is large.

Accordingly, the image display device 110 may decrease loss of an amount of light, and may prevent probable luminance lowering that may occur in a conventional multi-view image display device.

In this instance, a coating material or a reflective material that increases light reflective efficiency may be coated over a surface of the light guiding unit 220, such as a front, rear, side, and the like of the light guiding unit 220, to decrease leakage of a light that is generated from the light source unit 210.

Figure 4:
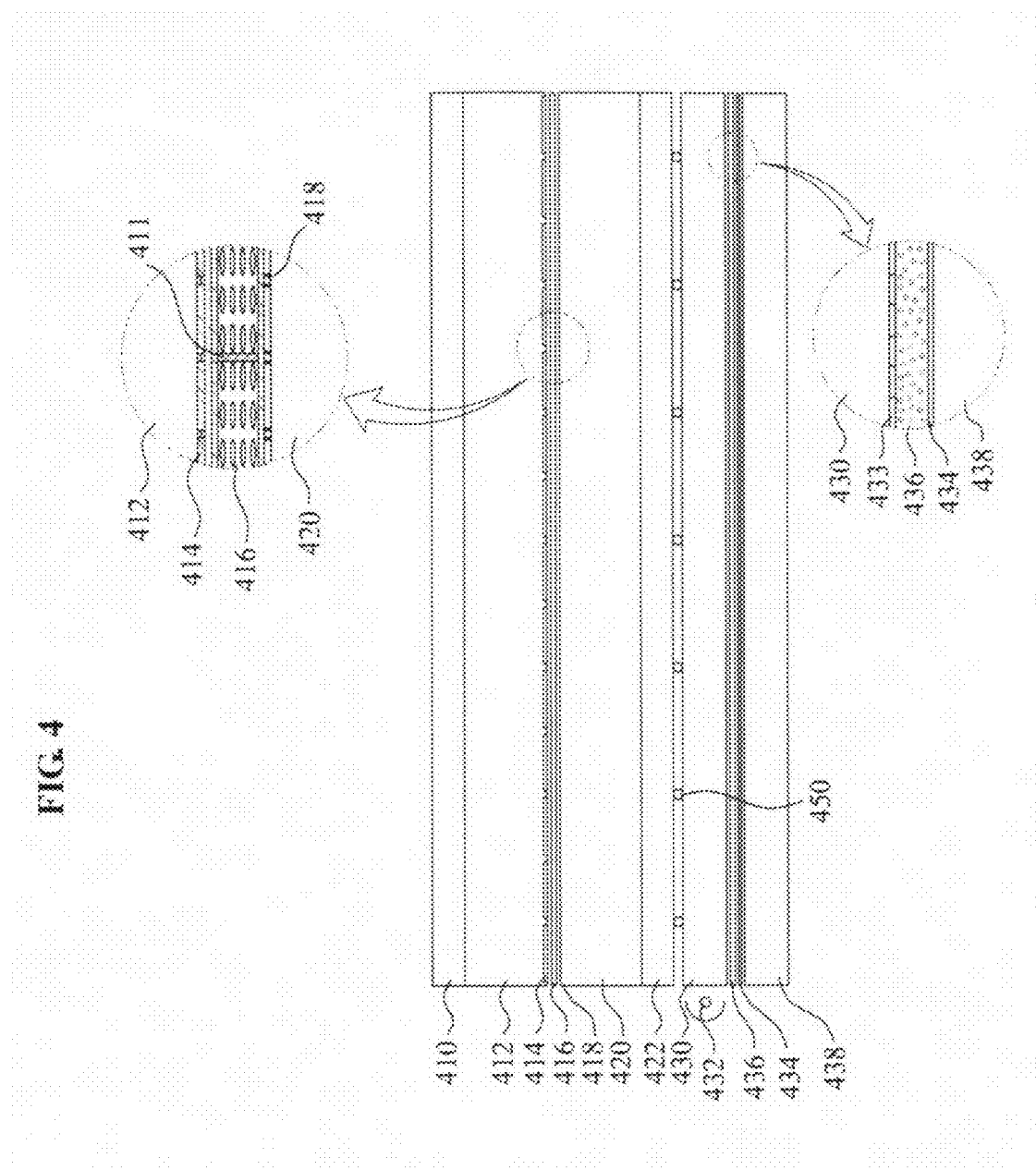
FIG. 4 illustrates a display panel unit, according to one or more embodiments.

Corresponding to the pixel representation unit 111 and backlight unit 112 of FIG. 1, FIG. 4 further illustrates a more detailed format of the aforementioned display panel unit 150, including the upper panel polarization film 130, TFT-LCD module 132, lower polarization film 134, backlight module 136, and light source 138, for example. Again, the display panel unit 150 may be classified into an LCD panel module and a backlight module, for example, with the backlight module 136 selectively changing a scattering of back-lit light to generate the time-division directional backlight. The LCD panel unit may include an upper polarization film 410, an upper glass panel 412, a color filter 414, a liquid crystal layer 416, a TFT layer 418, a lower glass panel 420, and a lower polarization film 422, for example. The liquid crystal layer 416 may fill a several dozen micrometers gap with liquid crystal, with the color filter 414 and a transparent electrode arranged on the upper glass panel 412, and the TFT area 418 and a transparent electrode arranged in the lower glass panel 420, separated by a spacer 411. Briefly, though one or more embodiments are explained in reference to an LCD panel, embodiments of the present invention are not limited to the same.

The backlight module may include a light source 432, a light guiding panel 430 that transfers light, a polymer dispersed liquid crystal (PDLC) layer 436 having a selective variable scattering capability, electrodes 433 and 434 for selectively applying a voltage to the PDLC layer, and a lower substrate 438. The LCD panel unit and the backlight module 136 may be optically separated by using a spacer 450, for example. The PDLC layer may form a gap that is a several micrometers to several dozen micrometers long, for example, each electrode 433 may be transparent and may be arranged in the lower part of the light guiding panel 430 to control PDLC, and each electrode 434 may have a high light-reflecting characteristic and may be arranged on an upper part of the lower substrate 438. When all the PDLC layer 436 implements a light scattering operation light scattered from the PDLC layer 436 may pass through the color filter 414 and may form a sub-pixel for a 2D image display. The strength of the light of the sub-pixel, i.e., the sub-pixel luminance, may be determined based on the upper and lower polarization films 410 and 422 and aspects of the liquid crystal of the liquid crystal layer 416. However, when only a select portion of the PDLC layer 436 implements the light scattering operation, e.g., when an extremely small portion of the PDLC implements the light scattering operation, the back-lit light may be selectively directed in the manner as appearing to have been emitted from a corresponding point source at the PDLC layer 436, and may thus become directional light radiating from that point source. Plural point sources can be used to generate a 3D image display. Controlling of the PDLC layer 436 to generate the 3D image and control the direction of light will be described in further detail below.

Figure 5:
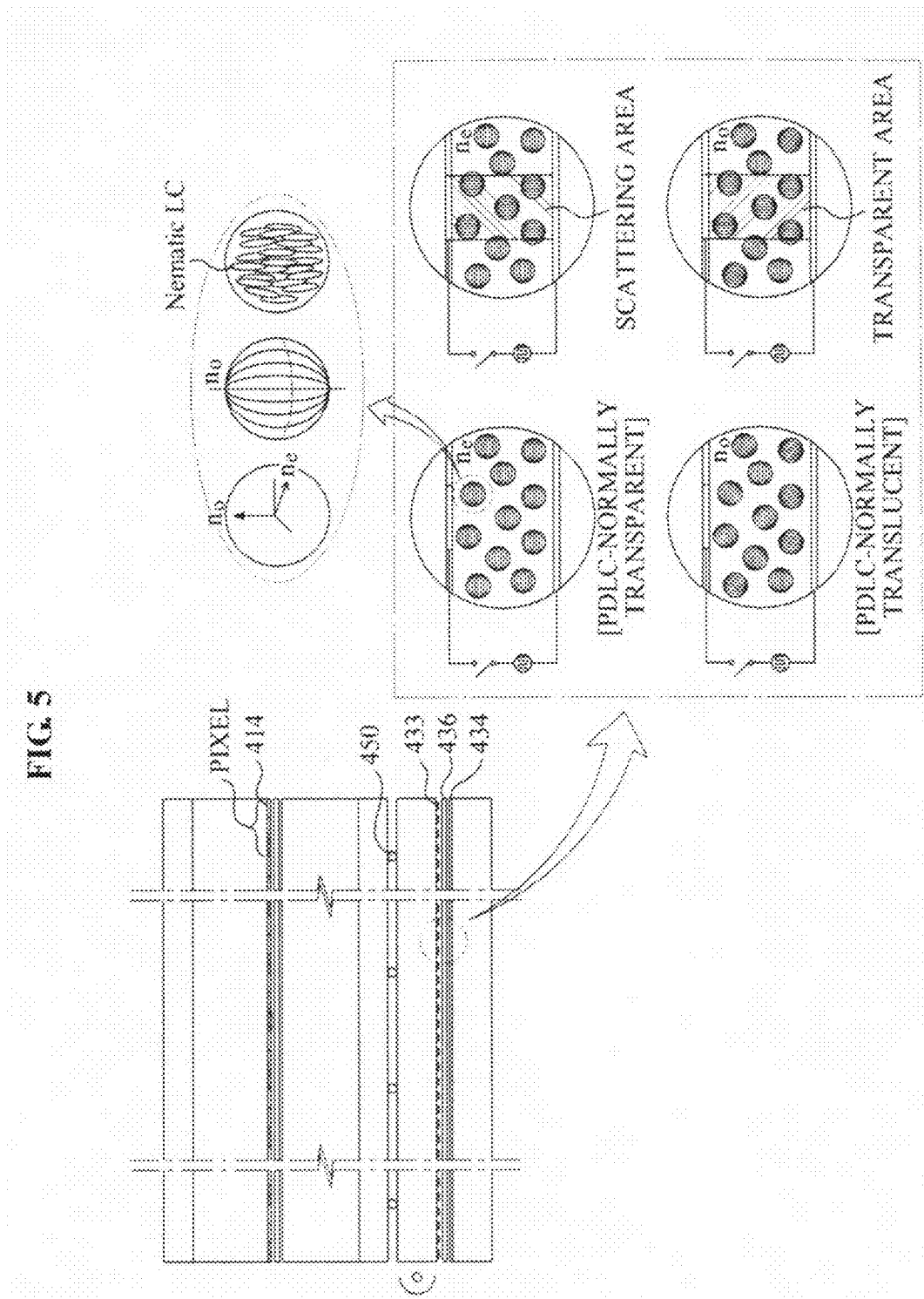
FIG. 5 illustrates a display panel unit, according to one or more embodiments.

As noted above with regard to FIG. 3, to display the 3D image, a select portion of the PDLC layer 436 may be controlled to implement the scattering operation. FIG. 5 illustrates a detailed format of a backlight module including the PDLC layer 436, as only an example. As noted, the PDLC may be in a form where a liquid crystal droplet is uniformly scattered inside a polymer, and the liquid crystal droplet constituted by a plurality of liquid crystals. As illustrated, the liquid crystal droplet shows different optical refraction features according to a controlled orientation, based on an optically anisotropic feature of liquid crystal, such that an orientation of the droplet is changed by controlling an applied voltage. Thus, it is possible to change the PDLC to be transparent or to be translucent by changing an optical refraction rate of the liquid crystal droplet. The corresponding area of PDLC may be transparent when a voltage is provided and may be translucent when a voltage is not applied, or conversely, the corresponding area of PDLC may be translucent when a voltage is provided and may be transparent when a voltage is applied.

As described in FIG. 5, and only as an example, the backlight module may, thus, include a plurality of electrodes (upper electrodes 433) being arranged in a lower part of the light guiding panel 430, and an electrode (lower electrode 434) being arranged in an upper part of the lower substrate 438, may change voltages applied to respective electrodes, and thereby change a degree of scattering of the corresponding areas of the PDLC layer located specifically between them. As noted, the plural upper electrodes 433 may be densely arranged, e.g., adjacent to each other or in a closely staggered manner, so that the light scattered by the PDLC can be sufficiently narrow.

Figure 6:
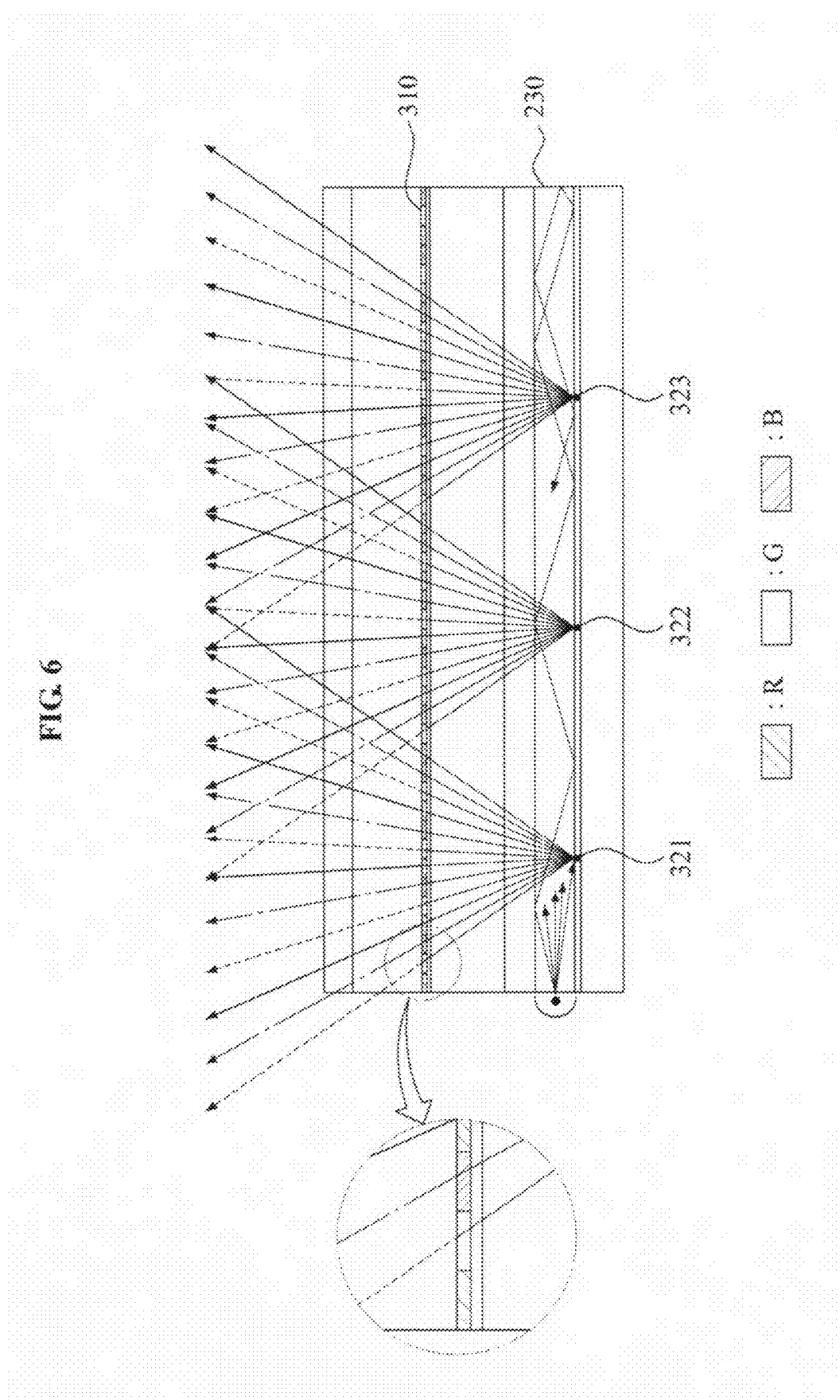
FIG. 6 illustrates an operation of an image display device, such as the image display device of FIG. 1, according to one or more embodiments.

FIG. 6 illustrates an operation of an image display device, such as the display device 110 of FIG. 1, according to one or more embodiments. Below, discussions regarding FIGS. 6-9 will be made with regard to the image display device 110 of FIG. 1, noting that embodiments are not limited to the same.

Here, in FIG. 6, for ease of description, it will be assumed that the image display device 110 of FIG. 1 represents twelve-direction directional image information in one or more embodiments, noting that embodiments are not limited to the same.

Here, although the pixel representation unit 111 of FIG. 1 may have a similar arrangement as the pixel representation unit 310 of FIG. 6, one or more embodiments will be described with reference to the pixel representation unit 310 shown in FIG. 6, while also making reference to the backlight unit 112 and controller 113 of FIG. 1.

The controller 113 may, thus, determine one or more select locations where a light emitted from the light source unit 210 is to be scattered based on a number of views of an input image.

The controller 113 may control the backlight unit 112 to enable a light to be scattered from the aforementioned variable scattering layer 230, such as the aforementioned PDLC layer, at twelve sub-pixel intervals 321, 322, and 323, as one or more embodiments may assume that the image display device 110 represents the twelve-direction directional image information.

In this instance, when the pixel representation unit 310 represents an RGB image, the twelve sub-pixels corresponds to four color pixels, as illustrated in FIG. 6.

In this instance, the image display device 110 may further include a voltage applying unit to apply a voltage between an upper electrode 240 and lower electrode 250 of FIG. 3, at the twelve sub-pixel intervals 321, 322, and 323.

Referring to FIG. 6, light is selectively scattered from the variable scattering layer 230 at the twelve sub-pixel intervals 321, 322, and 323.

Directional lights scattered from the variable scattering layer 230 may be applied to the pixel representation unit 310, and thereby the image display device 110 may display the twelve-direction directional image information.

In this instance, a resolution of a screen may be directly dependent on the number of light scattering points of the variable scattering layer 230, and thus, an image resolution may be lower compared with a representable resolution of the pixel representation unit 310.

However, according to other one or more embodiments, the image display device 110 changes locations where light emitted from the light source unit 210 is scattered at predetermined time intervals, for example, thereby preventing the lower resolution.

With respect to the above description, the controller 113 may control the backlight unit 112 to change a scattering pattern with respect to the light emitted from the light source 210 at predetermined time intervals, e.g., through time-division.

Here, in one or more embodiments, the controller 113 may apply data of the input image corresponding to the scattering pattern of the emitted light to the pixel representation unit 310 at time intervals synchronized with the predetermined time intervals.

In this instance, the pixel representation unit 310 may represent at least one pixel corresponding to the data of the input image applied to the controller 113, at time interval synchronized with the predetermined time intervals.

Hereinafter, above described operation will be described in greater detail with reference to FIG. 7.

FIG. 7 illustrates a view-division feature of an image display device, such as the image display device 110 of FIG. 1, according to one or more embodiments.

Depending on the case of when the image display device 110 represents an image of an odd numbered frame and a case of when the image display device represents an image of an even numbered frame, the controller 113 may control the backlight unit 112 to enable a light to be scattered in different locations.

As only an example, it may be assumed that the image display device 110 sequentially represents frames 1, 2, 3, 4, 5, and 6.

The controller 113 may control the backlight unit 112 to enable light to be scattered from a location illustrated in diagram 410 with respect to the frames 1, 3, and 5, and may control the backlight unit 112 to enable light to be scattered from a location illustrated in diagram 420 with respect to the frames 2, 4, and 6.

In this instance, image information and an oriented-direction that are generated while a directional light generated from the odd numbered frame passes a predetermined pixel may be different from image information and an oriented-direction that are generated while a directional light generated from the even numbered frame passes through the predetermined pixel.

As only an example, it may again be assumed that locations where light is scattered are light scattering locations 1, 2, 3, 4, 5, and 6, and a scattered light may be generated from odd numbered light scattering locations such as light scattering locations 1, 3, and 5 in the odd numbered frames, and a scattered light may be generated from even numbered light scattering locations such as light scattering locations 2, 4, and 6 in the even numbered frames.

In this instance, a scattered light of a first light scattering location passes through an $m^{th}$ pixel and a directional light is generated in the odd numbered frame, and a scattered light of a second light scattering location passes through the $m^{th}$ pixel and a directional light is generated in the even numbered frame. Subsequently, the odd numbered frame and the even numbered frame have different directional lights for the same pixels, the directional lights being generated while the differently scattered light respectively passes through the $m^{th}$ pixel.

In this instance, in the odd numbered frame, the controller 113 applies image data corresponding to the odd numbered frame to the pixel representation unit 310 of FIG. 6 at a time synchronized with the odd numbered frame, and in the even numbered frame, the controller 113 applies image data corresponding to the even numbered frame to the pixel representation unit 310 at a time synchronized with the even numbered frame.

That is, as described above, different image information may be applied for each case, namely, a case of when the scattered light of the first light scattering location passes through the $m^{th}$ pixel and a case of when a scattered light of the second light scattering location passes through the $m^{th}$ pixel.

Based on the above described principal, different directional lights having different image information from each other may be generated through a view-division scheme.

That is, the image display device 110 may lower a frame rate (fps) of an output image, like an interlace scan scheme that is used for improving a visual resolution in a conventional image display device. Instead, the image display device 110 may represent a greater number of pixels, and thereby may improve a visual resolution of a multi-view image.

With respect to the above description, referring to diagram 430, since a viewer may view N pixels from the odd numbered frame and may view N pixels from the even numbered frame, the viewer may feel as if the viewer views 2N pixels.

That is, the viewer may only view N 3D effect display pixels from a conventional image display device, whereas the viewer may view 2N 3D effect display pixels from the image display device 110 according to one or more embodiments, and thus, a visual resolution experienced by the viewer may be doubled compared with the resolution of the conventional image display device.

In this instance, a picture replay frequency of the image display device 110 may be desired to be greater than or equal to 120 Hz to represent a multi-view image of 60 fps through the image display device 110, noting that alternative embodiments are equally available.

Here, when the picture replay frequency of the image display device 110 is greater than or equal to 120 Hz, for example, the controller 113 may control the backlight unit 112 to change a scattering pattern of a light at 1/60 second intervals, and may apply image data corresponding to the scattering pattern of the light to the pixel representation unit 310 at time intervals synchronized with the 1/60 second intervals, thereby increasing a resolution of the multi-view image by a factor of two. This represents an example of time-division control of the light scattering.

One or more embodiments illustrating that the image display device 110 displays the multi-view image according to a two view-division image representation scheme have been described with reference to FIG. 7.

However, the image display device 110 according to other one or more embodiments may use an N view-division and may represent the multi-view image, thereby increasing the resolution of the multi-view image.

As an example, when the picture replay frequency of the image display device 110 is greater than or equal to 240 Hz, the image display device may change the scattering pattern of a light at four frame intervals, thereby representing the multi-view image of 60 Hz.

In this instance, the resolution of the multi-view image displayed by the image display device 110 may be increased by a factor of four.

Figure 8:
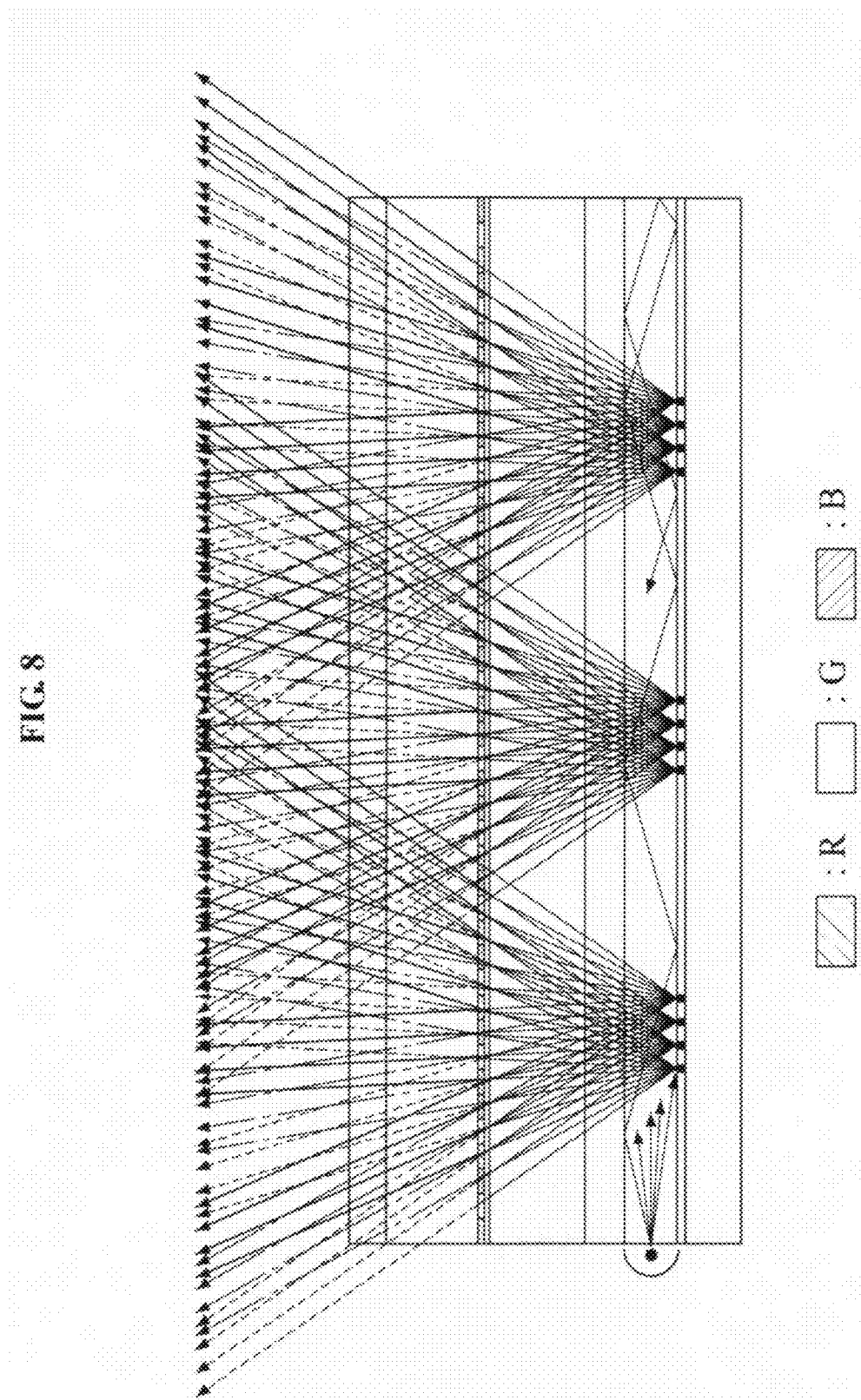
FIG. 8 illustrates an image display device, such as the image display device of FIG. 1, that increases a number of representable views by using a view-division feature, according to one or more embodiments.

FIG. 8 illustrates an example where an image display device, such as the image display device 110 of FIG. 1, increases the number of representable views by using a view-division feature, according to one or more embodiments.

The image display device 110 according to one or more embodiments may display an image through an N view-division representation scheme, thereby increasing a number of representable views.

As only an example, FIG. 8 illustrates an example that the image display device 110 represents an image through a four view-division representation scheme, and improves a resolution of a multi-view image, while increasing the number of representable views.

That is, the image display device 110 changes a scattering pattern of a light to enable different views to be formed at four frame intervals, and thereby may increase the number of representable views by a factor of four.

In other words, although the image display device 110 basically has a configuration being capable of generating a twelve-direction directional light, for example, the image display device 110 may generate a forty eight-direction directional light by an arrangement using the four view-division representation scheme, as illustrated in FIG. 8.

Figure 9:
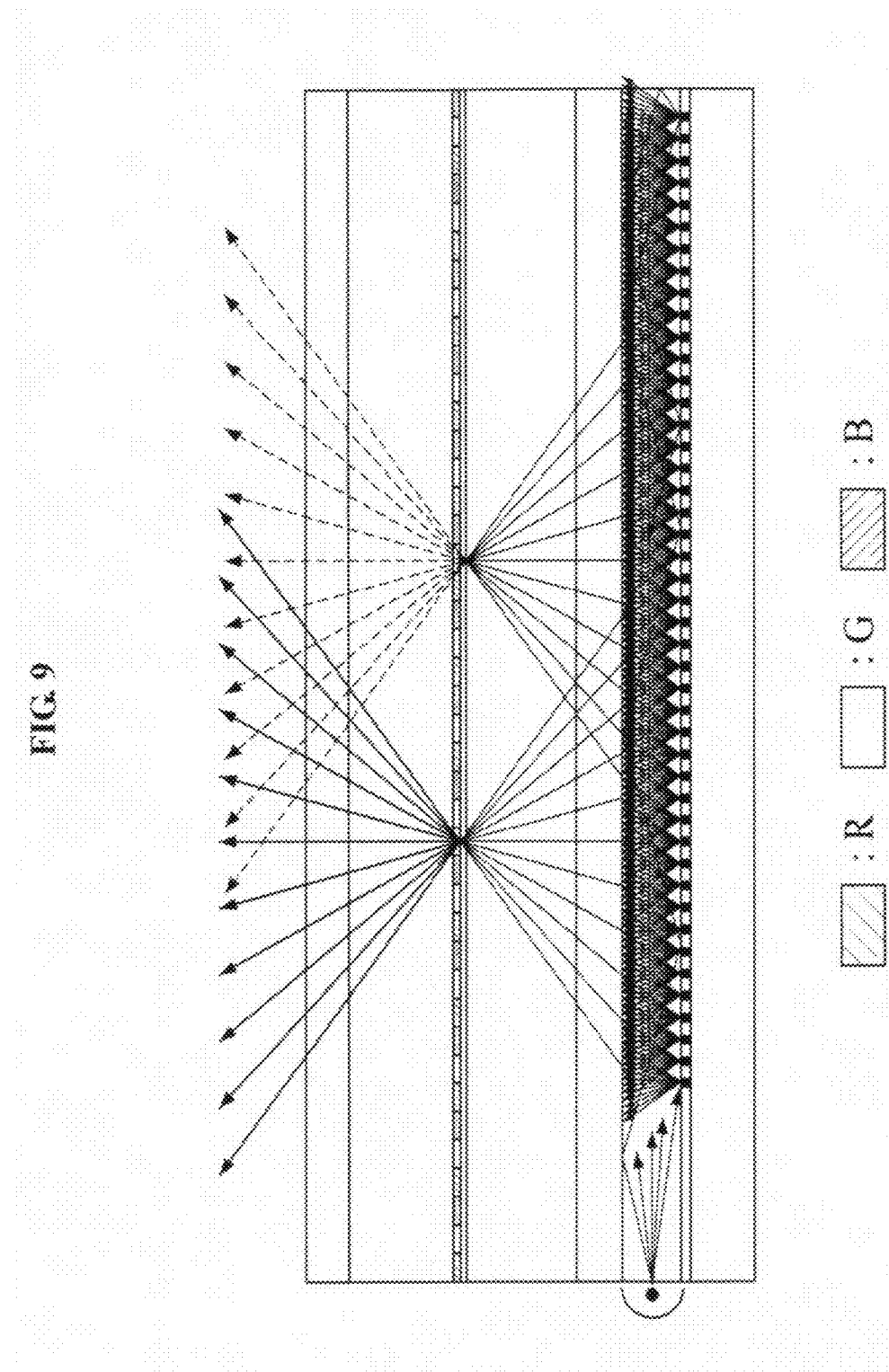
FIG. 9 illustrates an operation where an image display device, such as the image display device of FIG. 1, displays a 2D image, according to one or more embodiments.

FIG. 9 further illustrates an operation where an image display device, such as the image display device 110 of FIG. 1, displays a 2D image, according to one or more embodiments.

Here, according to one or more embodiments, the image display device 110 may represent a 2D image in addition to a multi-view image.

To represent a 2D image in addition to a multi-view image, the controller 113 may determine a type of input image input to the image display device 110.

When the input image is the 2D image, the controller 113 may control the backlight unit 112 to enable a light emitted from the light source unit 210 to be scattered from every area of the variable scattering layer 230 as illustrated in FIG. 9.

In this instance, the light scattered from every area of the variable scattering layer 230 may be evenly applied to the pixel representation unit 310 of FIG. 6, for example, and thus, the image display device 110 may have a similar light feature as a conventional 2D image display device.

The image display device 110 according to one or more embodiments may convert a display mode within a short time, since the time expended for conversion from a 2D image representation to a multi-view image representation and vice versa is merely several ms through several tens of ms.

Also, the image display device 110 may represent a part of a 2D image as a 3D image by a view-division representation scheme.

Figure 10:
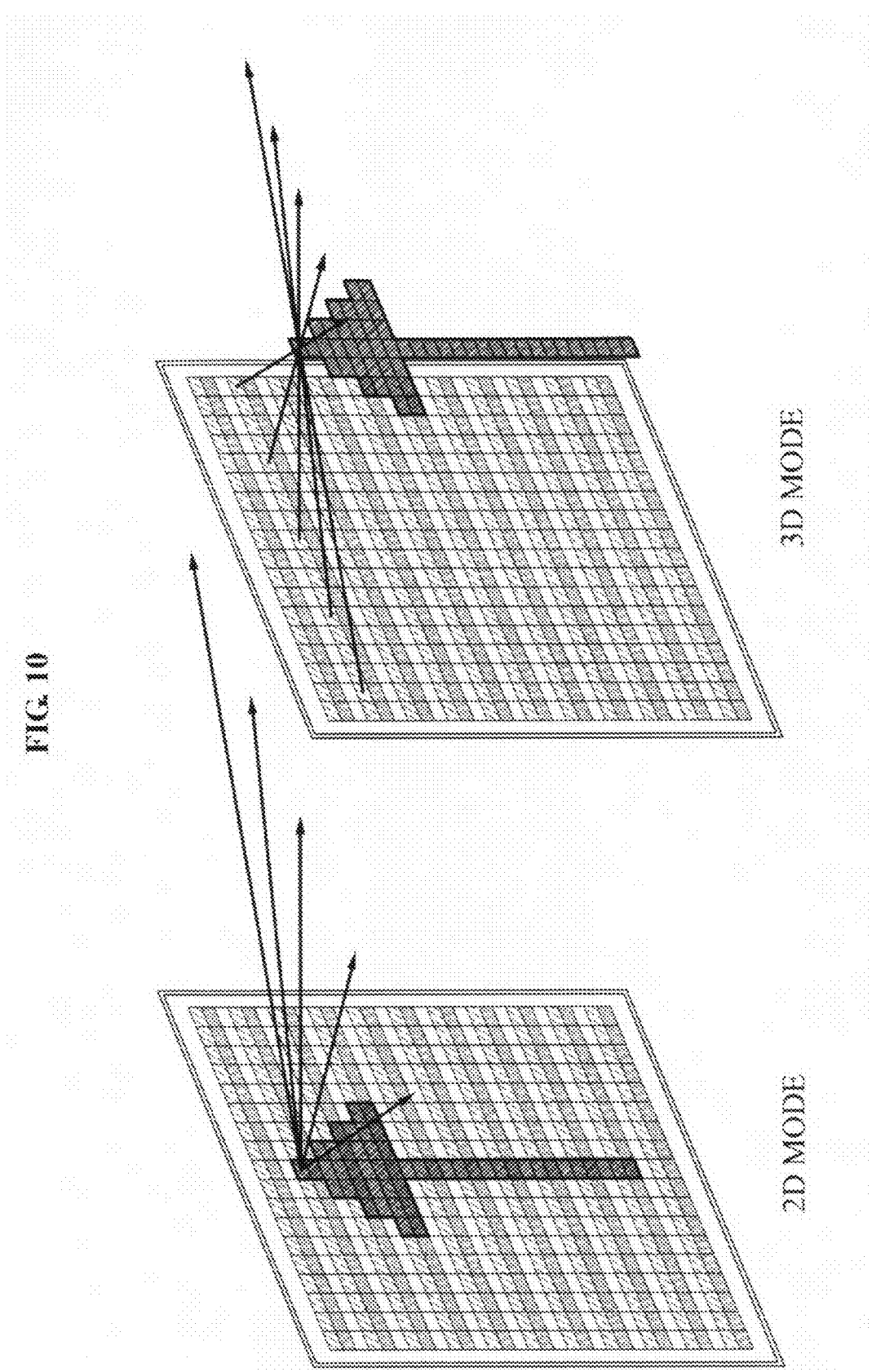
FIG. 10 illustrates a display of a 2D image on a 3D display, according to one or more embodiments.

FIG. 10 illustrates an example 3D display of a 2D image, according to one or more embodiments. In general, in a case of a 2D display, an image is formed on the display face, and more precisely, a color filter face. Here, with such a 2D displaying operation, the forming of the image may indicate that image information transmits scattered light to all directions based on the color filter face. However, a user may sense light information total-scattered from a surface of an object through a visual mechanism of two eyes, when seeing the object in the real world. That is, in a conventional 2D display, light randomly scattered from the scattering panel may pass through each aperture of a display panel, and thus, light information expressed at the color filter may only be displayed. Accordingly, in such a 2D environment, an image is always displayed on the display surface, and the image is seen the same in any direction. However, in the 3D image display, image information may be expressed as if an image is spaced away from the display by using the directional light as illustrated in FIG. 10. In this instance, different viewpoint images are respectively displayed through a left view and a right view, for example, and thus, the image may appear as existing in 3D space, as having depth. Further, when a user moves, the user may differently experience the image from different viewpoints.

Figure 11:
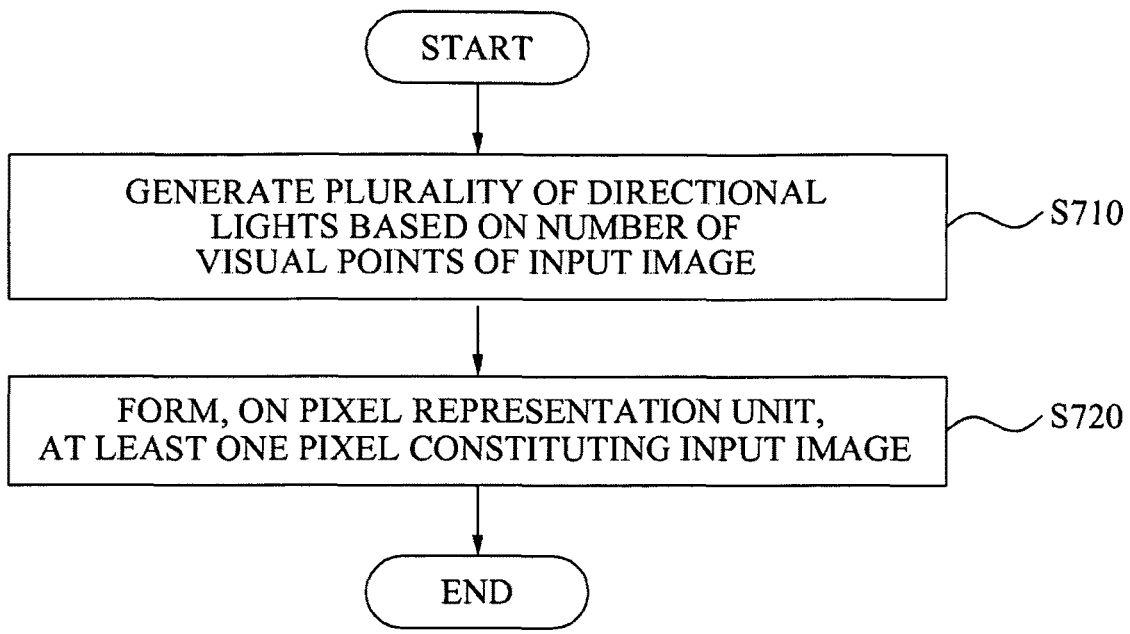
FIG. 11 illustrates an image display method, according to one or more embodiments.

FIG. 11 illustrates an image display method, according to one or more embodiments.

In operation S710, a plurality of directional lights are generated based on a number of views of an image input to the image display device.

In this instance, the input image may be either a 3D image or a 2D image.

According to one or more embodiments, operation S710 may include spreading of a light emitted from a light source unit through a light guiding unit.

Subsequently, operation S710 may include generating of the plurality of directional lights by selectively scattering the emitted light at predetermined area intervals of a variable scattering layer that is placed parallel with the light guiding unit, for example, based on the number of views of the input image. The selective scattering may be done based on time-division so that the same pixel is provided light from different directions at different times, for example.

In this instance, the variable scattering layer may include PDLC, noting that alternative embodiments are equally available.

According to one or more embodiments, when the input image is the 2D image, the emitted light may be scattered from every area of the variable scattering layer, and thus, the plurality of directional lights are generated, in operation S710. For the 2D image, it is not required that each and every area of the variable scattering layer be controlled to provide the multi-directional light.

Thus, in operation S720, at least one pixel of the input image is formed on the pixel representation unit.

According to one or more embodiments, a scattering pattern with respect to the emitted light is changed at predetermined time intervals in operation S710.

In this instance, operation S720 may include applying of data of the input image corresponding to the scattering pattern of the emitted light to the pixel representation unit at time intervals synchronized with the predetermined time intervals.

Subsequently, operation S720 may include forming of the at least one pixel corresponding to the applied data of the input image on the pixel representation unit, at time intervals synchronized with the predetermined time intervals.

FIG. 12 illustrates an image display method selectively displaying a 2D image and a 3D image, according to one or more embodiments. When an image content is input, it is determined, in operation S800, whether the image content is the 2D image or the 3D image. When the image is the 2D image, all portions of the backlight module may be controlled to perform a scattering operation, in operation S802, and image data may be displayed on a screen in a manner similar to a 2D display, in operation S804. When the content is the 3D image, a number of the desired time-divisions may be calculated based on a 3D image angle (3D Field of View), and a number of expression viewpoints and a 3D resolution may be determined, in operation S810. The image may then be displayed based on the calculated number of time-divisions or a corresponding predetermined number of time-divisions. For example, a $1^{st}$ backlight element group lighting may be made in operation S812, a $1^{st}$ group of 3D image/video may be displayed in operation S814, a $2^{nd}$ second backlight element group lighting may be made in operation S816, and a $2^{nd}$ group of 3D image/video may be displayed in operation S818, through an $n^{th}$ backlight element group lighting being made in operation S820, and an $n^{th}$ group of 3D image/video being displayed in operation S822. Here, in an embodiment, a video controller may accordingly determine the generation pattern of the backlight and an expression time based on the determined time-division, may control the backlight, and may further control the display of 3D image data corresponding to a pattern of the backlight in a panel. Further, the described operations may be repeated the same number of times as the number of determined time-divisions, for example.

The image display method according to one or more embodiments have been described with reference to FIGS. 11 and 12. Here, the image display method may correspond to the configuration of the image display device described with reference to FIGS. 1 through 10, and thus, a further detailed description for the image display method will be omitted.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of computer readable code include both machine code, such as produced by a compiler, and files containing higher level code that may be executed by the computer using an interpreter, for example. The media may also be a distributed network, so that the computer readable code is stored and executed in a distributed fashion. Still further, as only an example, the processing element could include a processor or a computer processor, and processing elements may be distributed and/or included in a single device.

The image display device and the method according to one or more embodiments may generate directional light from a backlight unit and may directly apply to the directional light to a pixel representation unit, thereby preventing a probable luminance lowering that may occur in a conventional multi-view image display device, and may change the location where the directional light comes from the backlight by using a time-division scheme, thereby improving a visual resolution of an output image. Further, one or more embodiments may relate to a display and display method that selectively displays a 2D image or 3D image, e.g., which may be used in a general display utilization field. As only an example, the utilization field includes a television, a monitor, a display of a portable divide, a display for advertisement use, and a display for educational use, noting that alternative embodiments are equally available.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An image display device, comprising:
a pixel representation unit to control respective representation of at least one pixel unit of an input image comprising a plurality of frames;
a backlight unit to selectively generate a plurality of directional lights based on a number of views of the input image, and to apply the generated plurality of directional lights to the pixel representation unit,
wherein the backlight unit includes a light source to emit light and a variable scattering layer to generate the plurality of directional lights by scattering the emitted light; and
a controller to control a scattering pattern to scatter the emitted light based on a predetermined time-division scheme for the input image,
wherein the controller controls a scattering pattern to scatter emitted light from a first plurality of light scattering areas of the variable scattering layer, corresponding to a first frame from among the plurality of frames, and applies first image data corresponding to the scattering pattern to the pixel representation unit, at a time interval synchronized with the first frame, and
controls a scattering pattern to scatter the emitted light from a second plurality of light scattering areas of the variable scattering layer, corresponding to a second frame from among the plurality of frames, and applies second image data corresponding to the scattering pattern to the pixel representation unit, at a time interval synchronized with the second frame,
wherein the predetermined time-division scheme, for a three-dimensional (3D) input image, includes emitting light from at least four scattering areas for each frame and is based on a 3D image angle and the number of views, wherein the number of views is greater than two.

2. The device of claim 1, wherein the input image is one of a three-dimensional (3D) image and a two-dimensional (2D) image.

3. The device of claim 1, wherein the backlight unit further comprises:
a light guiding unit to spread the light emitted from the light source unit; and
the variable scattering layer generates the plurality of directional lights by scattering the emitted light at predetermined separated area intervals, based on the number of views of the input image.

4. The device of claim 3, wherein the variable scattering layer is parallel with the light guiding unit.

5. The device of claim 3, wherein the backlight unit further comprises:
an upper electrode on a top surface of the variable scattering layer; and
a lower electrode on a bottom surface of the variable scattering layer,
wherein the variable scattering layer scatters the emitted light based on a variation of a voltage applied between the upper electrode and the lower electrode for a corresponding select portion of the variable scattering layer.

6. The device of claim 5,
wherein the controller applies the voltage between the upper electrode and the lower electrode based on the number of views of the input image.

7. The device of claim 3, wherein the controller controls the backlight unit to scatter the emitted light at the predetermined area intervals of the variable scattering layer based on the number of views of the input image.

8. The device of claim 7, wherein:
the pixel representation unit represents at least one pixel unit corresponding to the first image data of the input image applied by the controller.

9. The device of claim 7, wherein the controller determines whether the input image is a 2D image or a 3D image, and controls the backlight unit to scatter the emitted light from every area of the variable scattering layer when the input image is determined to be the 2D image.

10. The device of claim 3, wherein the variable scattering layer includes a polymer dispersed liquid crystal (PDLC).

11. The device of claim 1, wherein the predetermined time-division scheme comprises the controller controlling the scattering pattern to scatter the emitted light from the first plurality of light scattering areas of the variable scattering layer for odd-numbered frames from among the plurality of frames of the input image, and to scatter the emitted light from the second plurality of light scattering areas of the variable scattering layer for even-numbered frames from among the plurality of frames of the input image.

12. The device of claim 1, wherein the controller controls a scattering pattern to scatter the emitted light from a third plurality of light scattering areas of the variable scattering layer, corresponding to a third frame from among the plurality of frames, and applies third image data corresponding to the scattering pattern to the pixel representation unit, at a time interval synchronized with the third frame.

13. The device of claim 1, wherein the predetermined time-division scheme comprises the controller changing the scattering pattern to scatter the emitted light from the first plurality of light scattering areas and the second plurality of light scattering areas, based upon a picture replay frequency of the image display device and a desired frame rate.

14. An image displaying method, comprising:
emitting light;
selectively generating a plurality of directional lights by scattering the emitted light, by a variable scattering layer, based on a number of views of an input image comprising a plurality of frames;
controlling a scattering pattern, based on a predetermined time-division scheme for the input image, to scatter the emitted light from a first plurality of light scattering areas of a variable scattering layer, corresponding to a first frame from among the plurality of frames;
applying first image data corresponding to the scattering pattern to a pixel representation unit, at a time interval synchronized with the first frame;
controlling the scattering pattern, based on the predetermined time-division scheme for the input image, to scatter the emitted light from a second plurality of light scattering areas of a variable scattering layer, corresponding to a second frame from among the plurality of frames;
applying second image data corresponding to the scattering pattern to the pixel representation unit, at a time interval synchronized with the second frame; and
respectively forming, by the pixel representation unit, at least one pixel unit of the input image from incidence of the generated plurality of directional lights,
wherein the predetermined time-division scheme, for a three-dimensional (3D) input image, includes emitting light from at least four scattering areas for each frame and is based on a 3D image angle and the number of views, wherein the number of views is greater than two.

15. The method of claim 14, wherein the input image is one of a 3D image and a 2D image.

16. The method of claim 14, wherein a light source emits the light and the generating of the plurality of directional lights comprises:
spreading the light emitted from the light source unit through a light guiding unit; and
generating the plurality of directional lights by scattering the emitted light at predetermined separated area intervals of the variable scattering layer based on the number of views of the input image.

17. The method of claim 16, wherein the variable scattering layer is parallel with the light guiding unit.

18. The method of claim 16, wherein the generating of the plurality of directional lights generates the plurality of directional lights by scattering the emitted light from every area of the variable scattering area when the input image is determined to be a 2D image.

19. The method of claim 16, wherein the variable scattering layer includes PDLC.

20. The method of claim 14, wherein the respective forming of the at least one pixel unit comprises:
respectively forming, by the pixel representation unit, at least one pixel unit corresponding to the applied first image data of the input image.

21. A non-transitory computer readable recording medium comprising computer readable code to control at least one processing device to implement the method of claim 14.

22. An image display device, comprising:
a pixel representation unit to represent at least one pixel unit of an input image comprising a plurality of frames, through individual pixel unit control of pixel units of the pixel representation unit;
a backlight unit to selectively generate a plurality of directional lights based on a number of views of the input image; and
a controller to control a projection of different respective directional lights, of the plurality of directional lights, based on a predetermined time-division scheme for the input image,
wherein the controller controls the projection of different respective directional lights to a pixel unit of the pixel representation unit corresponding to a first frame among the plurality of frames, and applies first image data corresponding to the projection of the different respective directional lights, to the pixel representation unit, at a time interval synchronized with the first frame, in an outputting of the input image by the pixel representation unit, and
controls a projection of different respective directional lights, of the plurality of directional lights, to the pixel unit of the pixel representation unit corresponding to a second frame among the plurality of frames, and applies second image data corresponding to the projection of the different respective directional lights, to the pixel representation unit, at a time interval synchronized with the second frame, in an outputting of the input image by the pixel representation unit,
wherein the predetermined time-division scheme, for a three-dimensional (3D) input image, includes emitting light from at least four scattering areas for each frame and is based on a 3D image angle and the number of views, wherein the number of views is greater than two.

23. An image display method, comprising:
selectively generating a plurality of directional lights based on a number of views of an input image comprising a plurality of frames;
controlling a projection of different respective directional lights, of the plurality of directional lights, based on a predetermined time-division scheme for the input image, to a pixel unit of a pixel representation unit corresponding to a first frame among the plurality of frames;
applying first image data corresponding to the projection of the different respective directional lights, to the pixel representation unit, at a time interval synchronized with the first frame;
controlling the projection of different respective directional lights, of the plurality of directional lights, based on the predetermined time-division scheme for the input image, to the pixel unit of the pixel representation unit corresponding to a second frame among the plurality of frames;
applying second image data corresponding to the projection of the different respective directional lights, to the pixel representation unit, at a time interval synchronized with the second frame; and
controlling the pixel representation unit to output the input image based on incidence of the different directional lights, the controlling of the pixel representation unit differently controlling individual pixel units of the pixel representation unit,
wherein the predetermined time-division scheme, for a three-dimensional (3D) input image, includes emitting light from at least four scattering areas for each frame and is based on a 3D image angle and the number of views, wherein the number of views is greater than two.

24. The method of claim 23, further comprising controlling the selective generation of the directional lights to project a 2D image with depth through the different directional light application.

25. A non-transitory computer readable recording medium comprising computer readable code to control at least one processing device to implement the method of claim 23.

* * * * *